United States Patent Office 2,942,020
Patented June 21, 1960

2,942,020
N-SUBSTITUTED DI-IMIDO TRIPHOSPHORIC ACID ESTERS, AND A PROCESS OF MAKING SAME

Arno Debo, Heidelberg, Germany, assignor to Joh. A. Benckiser G.m.b.H. Chemische Fabrik, Ludwigshafen am Rhine, Germany, a corporation of Germany No Drawing. Filed Nov. 3, 1958, Ser. No. 771,243

Claims priority, application Germany Nov. 8, 1957

4 Claims. (Cl. 260—461)

The present invention relates to the preparation of derivatives of di-imido triphosphoric acid esters and more particularly to N-substituted derivatives of said esters and to a process of making same.

It is one object of the present invention to provide new and valuable N-substituted derivatives of di-imido triphosphoric acid esters.

Another object of the present invention is to provide valuable and highly effective viscosity stabilizers for hydraulic oils.

A further object of the present invention is to provide valuable plasticizers for plastic materials and especially for polyvinyl chloride plastics.

Still another object of the present invention is to provide a new process of producing such N-substituted derivatives of di-imido triphosphoric acid esters.

Other objects of the present invention and advantageous features thereof will become apparent as the description proceeds.

In principle, the present invention relates to N-substituted derivatives of di-imido triphosphoric acid esters of the following formula

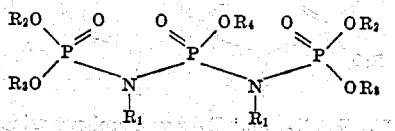

In said formula $R_1$, $R_2$, $R_3$, and $R_4$ represent alkyl radicals and more particularly lower alkyl radicals or aryl radicals and more particularly monocyclic aryl radicals such as the phenyl and the tolyl radicals, or aralkyl radicals and more particularly aryl substituted lower alkyl radicals such as the benzyl radical.

The new compounds are prepared by reacting one mole of a phosphoric acid diamide of the formula

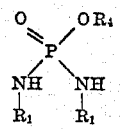

with two moles of a chloro phosphoric acid ester of the formula

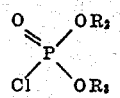

in an inert diluent in the presence of an alkali metal or an alkali metal hydride in an amount equivalent to the amount of chlorine present in the chloro phosphoric acid ester. Especially suitable inert diluents are organic solvents that do not react with sodium chloride or with acid halogenides, for instance, benzene and its homologues, ether, petroleum ether, petroleum hydrocarbon fractions, and the like unsubstituted hydrocarbons.

The reaction proceeds in accordance with the following equations:

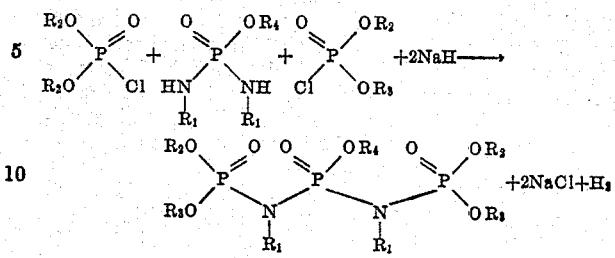

When using an alkali metal in this condensation reaction, it is the preferred procedure to first combine the alkali metal with the starting amide compound to form the corresponding di-alkali metal amide compound and then to add the chloro phosphoric acid ester. The alkali metal as well as the alkali metal hydride are preferably used in the form of suspensions in the diluent solvent employed.

The following examples serve to illustrate the present invention without, however, limiting the same thereto:

EXAMPLE 1

*Diphenyl imido triphosphoric acid pentaphenyl ester*

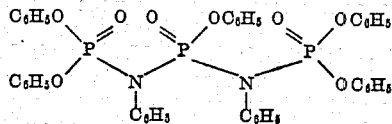

27 g. of chloro phosphoric acid diphenyl ester are added to a solution of 16.2 g. of phosphoric acid phenyl ester dianilide in 150 g. of xylene. 13.0 g. of a 20% suspension of sodium hydride in xylene are added while stirring. Care is taken to exclude moisture during addition of said sodium hydride suspension. Hydrogen is released and an exothermic reaction takes place. After this has ended, the precipitated sodium chloride is allowed to settle and is filtered off. The solvent is removed by distillation from the filtrate. Should the residual syrup still contain chlorine, it is dissolved in 80% of ethanol and the solution is passed first through an anion exchange resin sold under the trade name "Dowex 2" and then through a kation exchange resin, sold under the trade name "Dowex 50." On removing ethanol and water by distillation from the filtrate and rapidly cooling the residue, a glassy mass is obtained which corresponds to the above given formula. The product is readily soluble in ethanol and xylene but insoluble in water and petroleum ether. The yield is 30 g., corresponding to 77% of the theoretical yield.

*Analysis.*—Molecular weight 731, determined cryoscopically in nitrobenzene (calculated 788). Calculated: 11.8% P; 3.55% N. Found: 11.6% P; 3.6% N.

EXAMPLE 2

*Dibutyl imido triphosphoric acid monophenyl tetrabutyl ester*

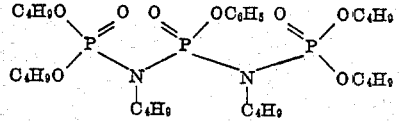

28.4 g. (0.1 mole) of phosphoric acid phenyl ester bis-monobutyl amide (melting point 54° C.) and 100 cc. of benzene are placed into a three-necked flask furnished with a dropping funnel, stirrer, and reflux condenser provided with a drying tube. The mixture is heated gently and 13.6 g. (0.2 mole) of a 33% dispersion of metallic sodium in xylene are added drop by drop thereto. A little over 2 l. of hydrogen are set free during addition of the sodium metal dispersion. 45.7 g. (0.2 mole) of chloro pheosphoric acid di-N-butyl ester are then added drop by drop to the resulting mixture. Thereafter, precipitated sodium chloride is removed by filtration and the filtrate is washed three times with water, each time with about 100 cc. The washed filtrate is dried over sodium sulfate and benzene is removed from the dried solution by distillation in a vacuum. The resulting residue represents a compound of the above given formula. It is obtained in the form of a yellowish oil, having a refractive index of $n_D^{20}=1.4629$. The yield is 51 g., corresponding to 76.5% of the theoretical yield.

*Analysis.*—Calculated: 4.19% N; 13.95% P. Found: 4.2% N; 13.9% P.

The phosphoric acid phenyl ester bis-monobutyl amide used as the one reaction component in Example 2, is prepared by dissolving 5.8 g. (0.8 mole) of n-butylamine in 150 cc. of benzene. 42 g. (0.2 mole) of dichloro phosphoric acid phenyl ester are added drop by drop to said solution while carefully excluding moisture. The precipitated di-butylamide hydrochloride is removed by filtration. Benzene is distilled off from the filtrate, and the residue is washed three times with water, each time with 100 cc. On drying the washed syrupy residue in a vacuum, it solidifies to a white crystalline mass. The yield is 34.5 g. corresponding to a yield of 81% of the theoretical yield. The melting point of the resulting phosphoric acid phenyl ester bis-monobutyl amide is 54° C.

*Analysis.*—Calculated: 9.86% N. Found; 9.55% N.

It is, of course, understood that, in place of chloro phosphoric acid diphenyl ester used as the one reaction component in Example 1 and of chloro phosphoric acid di-n-butyl ester used as the one reaction component in Example 2, there may be employed other chloro phosphoric acid di-esters, such as Chloro phosphoric acid di-ethyl ester,
    Chloro phosphoric acid di-n-propyl ester,
    Chloro phosphoric acid di-isopentyl ester,
    Chloro phosphoric acid di-tolyl ester,
    Chloro phosphoric acid di-benzyl ester.

Otherwise the reaction procedure is followed as described in the preceding examples.

In place of the other reaction component, the phosphoric acid phenyl ester di-anilide of Example 1 or the phosphoric acid phenyl ester bis-monobutyl amide of Example 2, there may be used equimolecular amounts of Phosphoric acid ethyl ester dianilide,
Phosphoric acid propyl ester dianilide,
Phosphoric acid n-amyl ester dianilide,
Phosphoric acid benzyl ester dianilide,
Phosphoric acid tolyl ester dianilide,
Phosphoric acid phenyl ester ditolidide.
Phosphoric acid benzyl ester bis-monoethyl amide,
Phosphoric acid benzyl ester bis-monobutyl amide.

Otherwise the procedure is followed as described in the preceding examples.

As stated hereinabove, the compounds according to the present invention are useful as additives to hydraulic oils. They have a stabilizing effect upon the viscosity of such oils. They are usually added to such oils in amounts between about 5% and about 50% and preferably in amounts between about 15% and about 30%. They have proved of special value in hydraulic oils based on mineral oils, but may also be added to hydraulic oils based on vegetable oils, such as castor oil and the like.

The new compounds have also been employed as plasticizers for polyvinylchloride plastics. They are added thereto in amounts between about 10% and about 50% and preferably in amounts between about 20% and about 40%.

Of course, many changes and variations in the starting materials and reaction components employed, in the condensing agents and solvents used, in the reaction conditions, temperature and duration, in the methods of working up the reaction mixtures and of purifying the reaction products, and the like may be made by those skilled in the art in accordance with the principles set forth herein and in the claims annexed hereto.

I claim:

1. Diphenyl imido triphosphoric acid pentaphenyl ester.
2. Dibutyl imido triphosphoric acid monophenyl tetrabutyl ester.
3. A di-(lower alkyl) imido triphosphoric acid monophenyl tetra-(lower alkyl) ester.
4. An N-substituted ester of di-imido triphosphoric acid, said ester having the formula

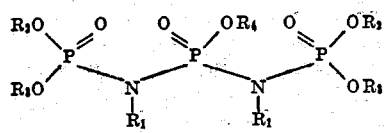

wherein $R_1$, $R_2$, $R_3$, and $R_4$ are members selected from the group consisting of lower alkyl radicals, the phenyl radical, lower alkyl substituted phenyl radicals, and the benzyl radical.

References Cited in the file of this patent

UNITED STATES PATENTS 2,479,407   Rieff et al.  ---------- Aug. 16, 1949